(12) United States Patent
Nelles et al.

(10) Patent No.: US 6,645,542 B2
(45) Date of Patent: Nov. 11, 2003

(54) METHOD FOR THE MANUFACTURE OF RICE-BASED FOOD ADDITIVE

(76) Inventors: Jakob Nelles, 1048 Pershing Rd., Maquoketa, IA (US) 52060; Anthony J. Hilgemann, 1381 Plum La., Mosinee, WI (US) 54455

( * ) Notice: Subject to any disclaimer, the term of this patent is extended or adjusted under 35 U.S.C. 154(b) by 0 days.

(21) Appl. No.: 10/094,829

(22) Filed: Mar. 8, 2002

(65) Prior Publication Data

US 2002/0172750 A1 Nov. 21, 2002

Related U.S. Application Data

(63) Continuation-in-part of application No. 09/611,464, filed on Jul. 7, 2000, now abandoned, which is a continuation-in-part of application No. PCT/US98/25610, filed on Dec. 3, 1998, which is a continuation-in-part of application No. 08/869,114, filed on Jun. 4, 1997, now Pat. No. 5,952,030.

(51) Int. Cl.$^7$ .............................................. A23C 19/09
(52) U.S. Cl. ....................... 426/582; 426/506; 426/507; 426/580
(58) Field of Search ................................ 426/506, 507, 426/508, 582, 580, 615

(56) References Cited

U.S. PATENT DOCUMENTS

| 4,664,613 A | 5/1987 | Tomatis |
| 4,665,811 A | 5/1987 | Meyer |
| 4,898,745 A | 2/1990 | Zamzow |
| 4,919,943 A | 4/1990 | Yee et al. |
| 5,431,931 A | 7/1995 | Nauth et al. |
| 5,480,666 A | 1/1996 | Lindgren |
| 5,520,934 A | 5/1996 | Meilleur |
| 5,532,018 A | 7/1996 | Miller et al. |
| 5,709,900 A | 1/1998 | Miller et al. |
| 5,807,601 A | 9/1998 | Carpenter et al. |
| 5,876,778 A | * 3/1999 | Stewart ...................... 426/508 |
| 5,902,625 A | 5/1999 | Barz et al. |
| 6,086,926 A | 7/2000 | Bruce et al. |

FOREIGN PATENT DOCUMENTS

| EP | 0 146 765 | 7/1985 |
| EP | 0 155 782 A1 | 9/1985 |
| EP | 0 500 257 B1 | 8/1992 |
| EP | 0 515 318 A1 | 11/1992 |

OTHER PUBLICATIONS

Japan Abstract, filed Jan. 20, 1984, Hayashi Hiromichi.
Japan Abstract, filed Jan. 25, 1983, Morinaga Milk Ind Co.
XP 000639826, Use of Fat Replacers in Low Fat Mozzarella Cheese, D.J. McMahon, et al., 1996 J Dairy Sci 79:1911–1921.

* cited by examiner

*Primary Examiner*—Lien Tran
(74) *Attorney, Agent, or Firm*—Quarles & Brady LLP

(57) ABSTRACT

A method of producing high moisture content food products provides for introduction of rice stabilized water at high percentages with respect to the base food. The rice stabilized water is produced by cooking rice and water to saturation and then liquefying it with high shear reducing water loss.

19 Claims, 6 Drawing Sheets

METHOD FOR THE MANUFACTURE OF RICE-BASED FOOD ADDITIVE

CROSS-REFERENCE TO RELATED APPLICATIONS

This application is a continuation in part of application Ser. No. 09/611,464 filed Jul. 7, 2000, now abandoned, entitled: Apparatus and Method for the Manufacture of Rice-Based Food Additive, which is a continuation-in-part of PCT application PCT/US98/25610 filed Dec. 3, 1998 entitled: Apparatus and Method for the Manufacture of Reduced and Low Fat Pasta Filata Cheese which is a continuation-in-part of U.S. application Ser. No. 08/869,114 filed Jun. 4, 1997 entitled: Apparatus and Method for the Manufacture of Reduced and Low Fat Pasta Filata Cheese, now U.S. Pat. No. 5,952,030, all hereby incorporated by reference.

STATEMENT REGARDING FEDERALLY SPONSORED RESEARCH OR DEVELOPMENT

Background of the Invention

The invention relates generally to an ingredient, apparatus and method for the production of high moisture food items, and in particular, to an apparatus and process for incorporating rice-stabilized water into food items including cheese and sausage.

Interest in reduced and low fat foods that nevertheless maintain the mouth feel, and texture of the original foods has led to interest in replacing fat with fat mimetics and increasing the moisture content of these foods so as to dilute fat with water.

The simple introduction of additional water to most products is not successful because of problems of product rheology, water release in storage and changed functionality. For these reasons, gums may be added to stabilize or bind the water in the product. The introduction of substantial amounts of gum may make a product less appealing and some consumers may avoid products with gums in favor of what is considered more "natural" ingredients.

The parent application to the present case describes a method of making of low fat pasta filata cheese by incorporating a water-rice mixture into the cheese at the kneading stage. It was found that this rice mixture allowed significant amounts of moisture to be added to cheese, thereby diluting fat, without adversely affecting the texture for which such cheeses including mozzarella cheese are prized.

The inventors have since discovered that the rice mixture may be used to significantly increase the water content of a variety of foods, not only pasta filata cheeses, but also other cheese and cheese products, sausages and the like. By incorporating and stabilizing water, the food retains its functionality, flavor and texture with reduced fat on a wet basis.

BRIEF SUMMARY OF THE INVENTION

The present invention provides a commercially practical method of high percentage augmentation of the moisture in food products. The invention combines rice grains and heated water and subjects the mixture to high shear to liquefy it without substantial release of water. This mixture is added to the desired food product while in liquefied form.

Although the inventors do not wish to be bound by a particular theory, this high shear method of producing a liquefied rice mixture is believed to preserve the structure of rice necessary to its water holding capacity. Further, this method is readily adapted to large process volumes and may use low cost rice as opposed to more expensive rice flours.

Specifically then, the present invention provides a method of manufacturing an augmented moisture food product using the steps of combining rice grains and heated water in a ratio allowing substantially complete absorption of the water within the rice grains. The mixture is then subjected to a high shear to liquefy the mixture without substantial release of water from the rice and then combined with the low moisture food ingredient.

Thus, it is one object of the invention to provide a natural and low cost method of stabilizing water to be introduced into food products to reduce their fat content or for other purposes.

The step of shearing the mixture of rice may include circulating the rice and water in a vessel with a high shear mixer and pumping the rice and water through a shear pump.

Thus, it is another object of the invention to provide a method of on-site preparation of a rice blend that is amenable to processes where occasional storage and transfer is required. The shear pump may recirculate the rice mixture to keep it liquefied and may be used to easily transport the rice mixture through standard pipes in liquefied form to where it will be needed.

The vessel may have heated walls and the method may include the step of scraping the inner surface of the walls of the heated vessel during the processing of the rice mixture. Thus, it is another object of the invention to provide for a simplified preparation of the rice mixture in a single vessel.

The food ingredient to which the rice mixture is added may be pasta filata cheese, other cheese and cheese products, or sausage meat.

Thus, it is another object of the invention to provide a general purpose, natural food substitute that may be used in a variety of products.

The rice grains and water may stand in the ratio of substantially one to two by weight.

Thus, it is another object of the invention to provide for extremely high water capacity in the rice mixture.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 2 is a cross sectional view of the kneading vessel and spray nozzle of FIG. 1 taken along lines 2—2 of FIG. 1 showing the internal auger and the path of standard pasta filata cheese into the upwardly opening hopper;

DETAILED DESCRIPTION OF THE INVENTION

Apparatus and Process

Figure 1:
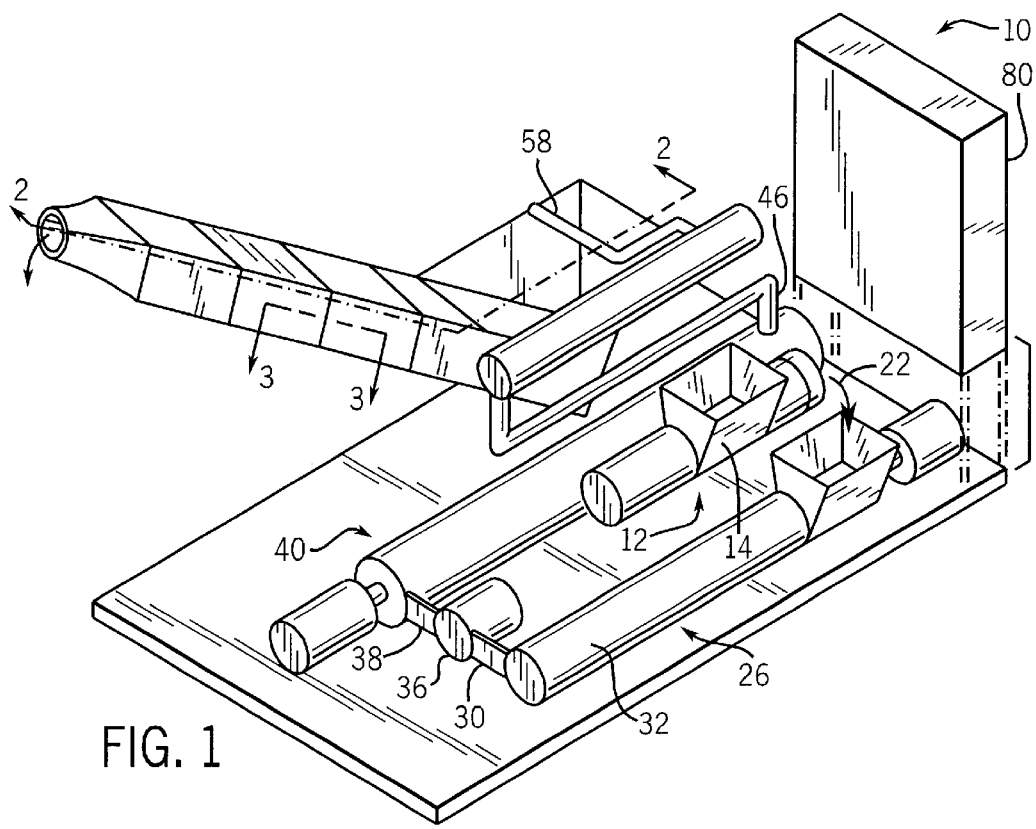
FIG. 1 is a simplified perspective view of the apparatus of the present invention for producing a reduced and low-fat pasta filata cheese showing a multiple auger heating system for the rice-based cheese substitute and a spray nozzle positioned over a hopper receiving standard pasta filata cheese and communicating with an upwardly extending kneading vessel.
Figure 4:
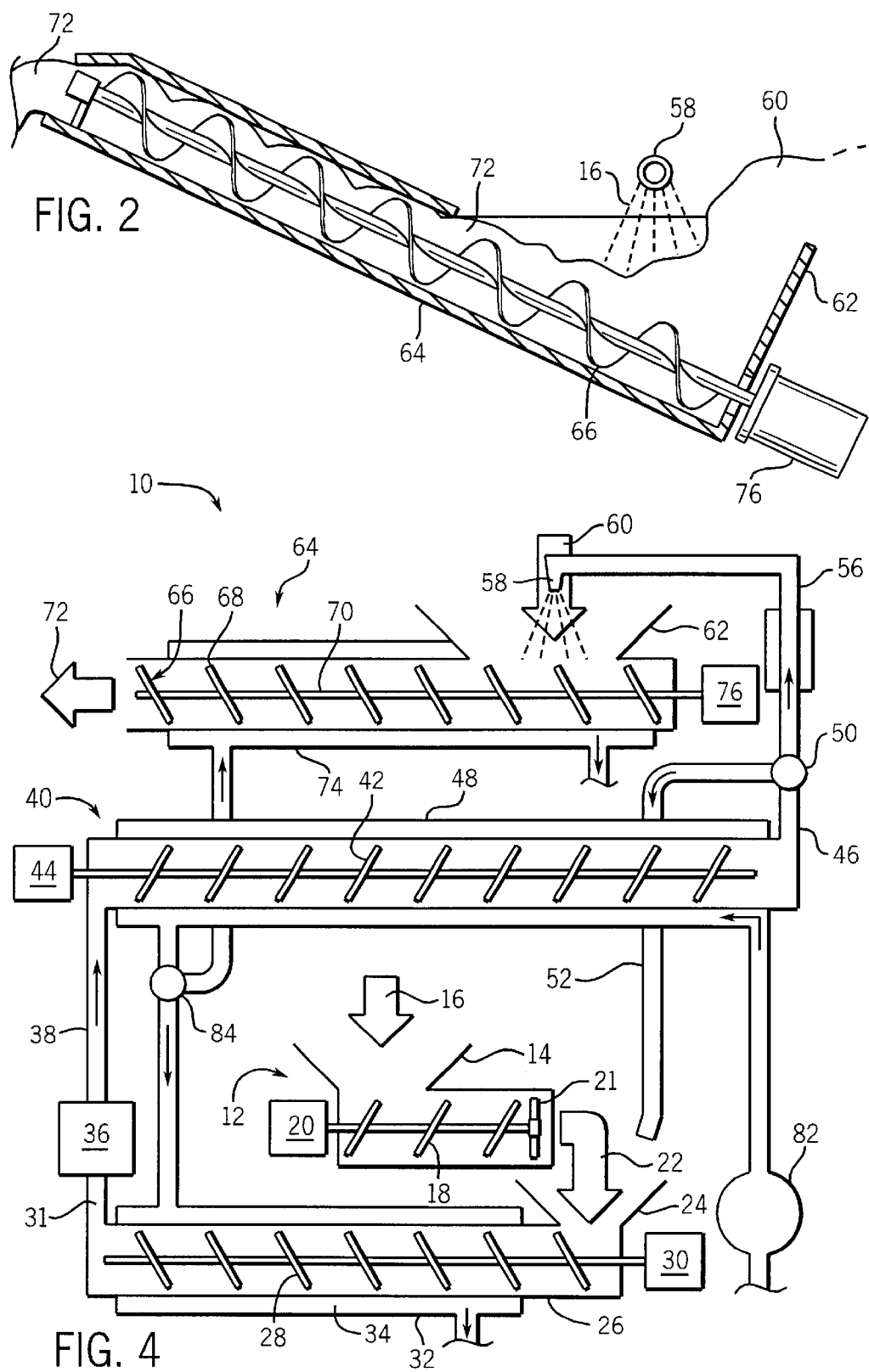
FIG. 4 is a block diagram of the apparatus of FIGS. 1–3 showing the path of the rice cheese substitute and standard pasta filata cheese during the process.

Referring now to FIGS. 1 and 4, a reduced and low-fat cheese manufacturing apparatus 10 includes a motor-driven grinder 12 of conventional design having a hopper 14 sized to receive blocks of a rice mixture 16 whose preparation will be described in detail below. An auger 18 (shown in FIG. 4) is positioned within the grinder 12 and driven by motor 20 to force the semi-solid rice mixture 16 past a cutter head 21 so as to be macerated and extruded as indicated by arrow 22 for receipt by a second hopper 24. The second hopper 24 opens into one end of a tubular heating chamber 26 which includes a second auger 28 driven by motor 30 to move the macerated rice mixture 16 along the length of the tubular heating chamber 26 from the hopper 24 to an exit port 31 at the opposite end of the tubular heating chamber 26. The tubular heating chamber 26 is jacketed by a concentric hot water jacket 32 through which heated water 34 is passed. The heated water 34 is given a temperature so as to heat the macerated rice mixture 16 to approximately 120 degrees Fahrenheit as it passes along tubular heating chamber 26.

When the rice mixture 16 reaches exit port 31, it is sufficiently liquefied so that it may be received by a metering pump 36 of conventional design which provides a precise volume flow of the rice mixture 16 into connecting pipe 38 leading to a second tubular heating chamber 40. Second tubular heating chamber 40 is similar in construction to tubular heating chamber 26 having a generally cylindrical lumen holding a third auger 42 driven by a motor 44 to move the liquefied cheese rice substitute from connecting pipe 38 to an exit port 46. Again, second tubular heating chamber 40 has a hot water jacket 48 regulated to adjust the rice mixture 16 to a temperature from 185–190 degrees Fahrenheit. The heated and liquefied rice mixture 16 exits port 46 to valve 50 which may recirculate the rice mixture 16 through recirculation pipe 52 back to hopper 24 so as to constantly keep the rice mixture 16 flowing and heated, even if cheese is not actively being processed.

When pasta filata cheese is being processed, the rice mixture 16 passes through tube 56 to a spray nozzle 58. The nozzle 58 is a length of pipe having a plurality of holes drilled in its lower surface to provide an orifice through which a rice mixture 16 may exit.

Referring now to FIGS. 1, 2, and 4, the reduced and low fat cheese manufacturing apparatus 10 may be positioned to receive standard pasta filata cheese 60 directly from a stretching machine, but prior to its molding, chilling, or brining. Ideally, the pasta filata cheese 60 is delivered from the stretcher (not shown) at a temperature of approximately 140 degrees Fahrenheit and has a fully formed fiber structure. The pasta filata cheese 60 drops into hopper 62 at the base of an upwardly sloping kneading chamber 64. Referring in particular to FIG. 4, the kneading chamber 64 is jacketed with a concentric steam jacket 74 adjusted to a temperature of approximately 140 degrees Fahrenheit, but beneath the melting point of the cheese mixture 72. The spray nozzle 58 is positioned above the hopper so that the liquefied and heated rice mixture 16 may be sprayed upon the surface of the pasta filata cheese 60 as it enters the hopper 62. The flow rate of the pasta filata cheese 60 and the rice mixture 16 from nozzle 58 may be adjusted so that the combined pasta filata cheese 60 and rice mixture 16 (cheese mixture 72) is as high as 10–25% rice mixture 16 by weight.

Figure 3:
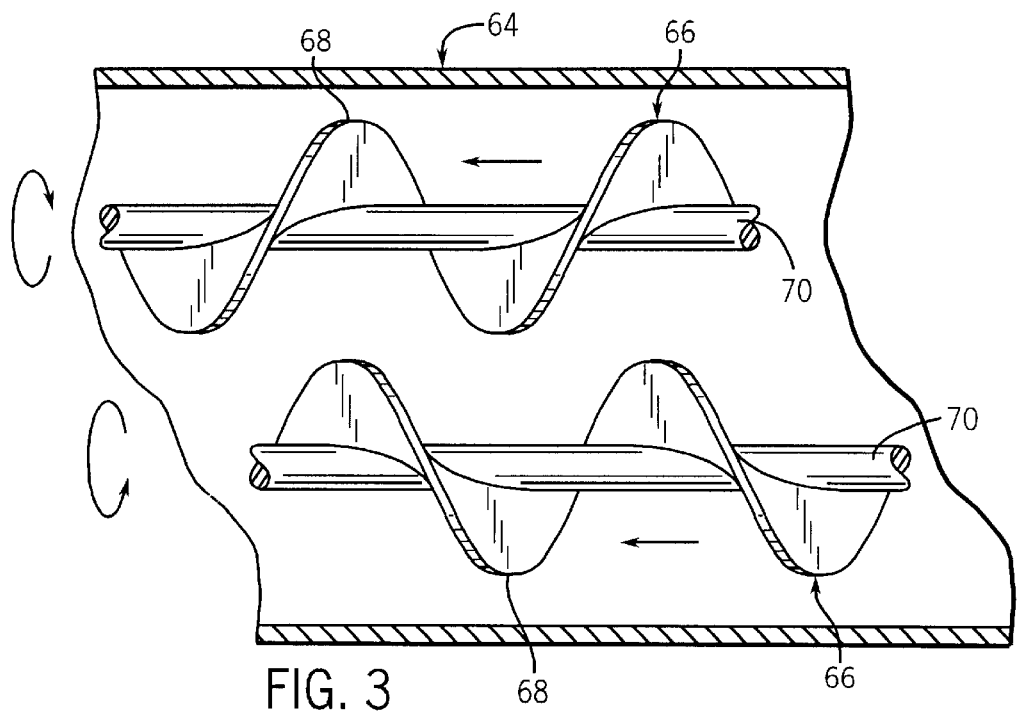
FIG. 3 is a detailed fragmentary cross-sectional view taken along lines 3—3 of FIG. 1 showing two kneading augers within the kneading chamber of FIG. 2 in intermeshed counter rotating configuration.

Referring now to FIGS. 2 and 3, positioned within the kneading chamber 64 are twin augers 66 having helical vanes 68 passing in helixes of opposite "hand" around shafts 70 so that the vanes 68 may intermesh while the shafts 70 turn in opposite directions. A motor 76 turns the augers 66 through a conventional gear drive as will be understood to those of ordinary skill in the art. The augers 66 so turning provide a generally upward motion to the mixture of the pasta filata cheese 60 and the rice mixture 16 through the kneading chamber 64.

The clearance between the vanes 68 and the walls of the kneading chamber 64 and the pitch and speed of the augers 66 is adjusted so that the cheese mixture 72 is stretched and folded between the augers and the inside of the kneading chamber 64 without cutting, so that the fibers of the cheese are preserved, yet coated uniformly with the rice mixture 16. Generally, the augers 66 provide a similar action to hand kneading in which the palm of the hand is pressed against a lump of dough of cheese to roll it along a hard surface, stretching and compressing the cheese back upon itself.

At the upper end of the kneading chamber 64 is an exit opening through which the cheese mixture 72 exits as a reduced and low-fat pasta filata cheese. It may then be received by a molder chiller or brining tank of conventional design.

The reduced and low-fat cheese manufacturing apparatus 10 is generally instrumented and controlled through a control panel 80 providing control for the speed of the metering pump 36 of the motors 30, 44, and 76 and of valves necessary to hold the temperatures of the hot water jackets 74, 48, and 32 within the range as described. The heated water 34 may be provided by a steam heat exchanger 82 shown in FIG. 4 which provides heated water 34 directly to hot water jacket 48 which may then be cooled and transmitted to jackets 74 and 32 by metering valve 84.

The Rice Mixture

The rice mixture 16 is formed principally of rice and water mixed and heated until it reaches a gel-like consistency. Preferably, the rice may be crushed in a grinder to a consistency of approximately two-millimeter particle size. A ribbon blender may then be used to mix the rice with approximately two hundred percent water by weight while it is heated to 160 degrees Fahrenheit for at least thirty minutes. The rice is then allowed to cool for approximately one hour with blending while other ingredients are added until it has reached approximately 70 degrees Fahrenheit. It is then molded into forty-pound blocks and refrigerated. The blocks are fed into the hopper 14 of the reduced and low-fat cheese manufacturing apparatus 10 as they are needed.

Although the exact composition of the rice mixture may vary, in a preferred embodiment, the rice mixture is compounded of the following ingredients:

TABLE I

| Ingredient | Percent by weight |
| --- | --- |
| Water | 39% |
| Rice | 37.2% |
| Corn syrup | 7.1% |
| Whey powder | 4.8% |
| B950 food starch | 4.8% |
| Maltrin M040 | 4.8% |
| Salt | 1.0% |
| Cheddar flavor | 0.5% |
| Guar Gum | 0.8% |

The composition of the rice mixture 16 with respect to its minor ingredients may be varied, particularly with respect to emulsifiers and flavoring agents.

In yet another embodiment, the rice/cheese substitute may be formulated for a substantially higher percentage of water.

TABLE II

| Ingredient | Percentage by Weight | Typical Batch Amounts |
| --- | --- | --- |
| Long grain white rice | 28% | 300 lbs. |
| Water | 60% | 650 lbs. |
| GPC-Maltrin® M200 Corn Syrup Solids | 3–6% | 50 lbs. |
| GPC-Maltrin® M040 Maltodextrin | 2.5–5% | 40 lbs. |
| GPC-Pure-Set® B950 Food Starch-Modified | 2.5–5% | 40 lbs. |

In preparing this blend, the equipment described above with respect to FIGS. 5 and 6 may be used with 650 lbs. of water added to the heated vessel 90 and brought to a boiling temperature of 212° F. Three hundred pounds of rice may be added to the heated vessel 90, the rice being generally intact or naturally broken rice kernels without grinding or similar preprocessing. Heat may be introduced into the vessel 90 and the rice may be cooked for 25 minutes after which the scraper blades 128 and high shear mixer head 116 are started. The remaining ingredients are then added and the mixture agitated and sheared for ten additional minutes. Finally, the rice mixture 16 is pumped through shear pump 132 to be circulated for 20 minutes.

On-Site Manufacture of the Rice-Based Cheese Substitute

Figure 5:
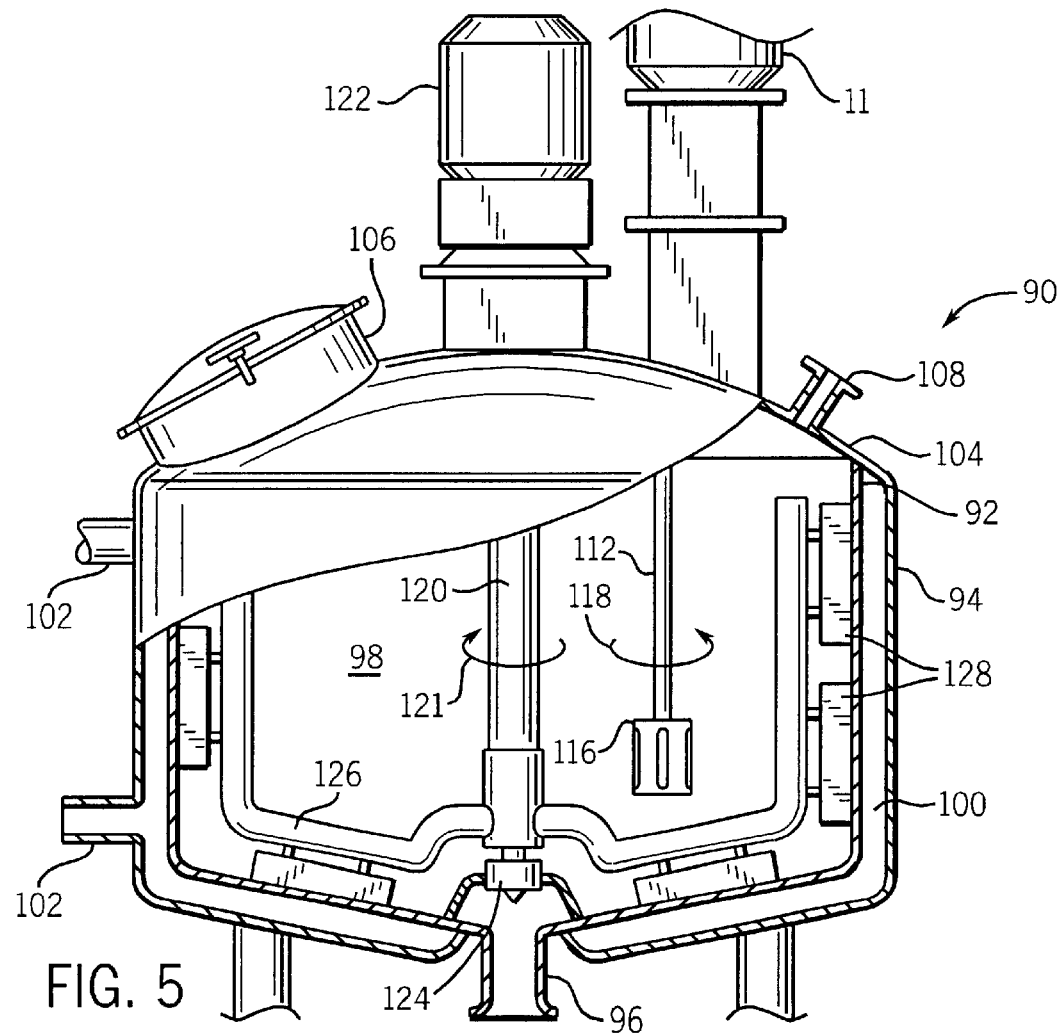
FIG. 5 is a cross-sectional view of a preparation vessel that provides an alternative method for the manufacture of the rice cheese substitute.

Referring now to FIG. 5 in an alternative embodiment, the of the grinder 12, tubular heating chamber 26 and tubular heating chamber 40 (shown in FIG. 4) previously used to prepare a premanufactured semi-solid rice mixture 16, may be replaced and the need for premanufacturing avoided by using a batch operated heated vessel 90 on-site.

The heated vessel 90 is a double-walled container having a cylindrical inner wall 92 surrounded coaxially by a cylindrical outer wall 94. The walls 92 and 94 continue around a lower base of their respective cylinders to culminate in an axial drain port 96 providing a passage from a mixing volume 98 surrounded by the inner wall 92. The inner wall 92 and outer wall 94 define between them a steam jacket volume 100 into which steam may be introduced and extracted through ports 102. In this manner, the inner wall 92 may be heated to a controlled temperature so as to heat the material contained within the mixing volume 98.

An upper cover 104 joins the inner wall 92 and outer wall 94 at their upper edges and covers the mixing volume 98. Cover 104 is breached by access hatch 106 into which ingredients as will be described may be introduced. A smaller entrance port 108 through cover 104 allows for the recirculation of material from inside the volume 98 out through the drain port 96 and back into the entrance port 108 as will also be described.

Mounted on top of the cover 104 is a shear mixer motor 110 driving a shaft 112 piercing the cover 104 and terminating within the volume 98 at a high shear mixer head 116. Such mixer heads 116 are well known in the art and are commercially available from Admix of Manchester, N.H., United States under the tradename Rotosolver. During operation, the high shear mixer head 116 will rotate as indicated by arrow 118.

The shaft 112 may be off center to the center axis of the cylindrical volume 98 to allow for the passage of a scraper shaft 120 through cover 104 along the center axis. The scraper shaft 120 is driven by scraper motor 122 also mounted on top of cover 104. The scraper shaft 120 terminates at its lower end at a bearing 124 axially aligned with the drain port 96 but supported above the drain port 96 so as not to obstruct it. Scraper shaft 120 rotates about its extent as driven by the scraper motor 122 and as indicated by arrow 121.

Extending symmetrically and radially outward from the lower end of the scraper shaft 120, above the bearing 124, are scraper arms 126 which follow along and above the portion of the inner wall 92 forming the lower base and along and inside the portion of the inner wall 92 forming cylindrical vertical walls. Scraper blades 128 are attached along the arms 126 between the arms and the inner wall 92 so as to scrape along the inner wall 92 preventing overheating of material immediately adjacent to the heated inner walls 92. Scraper blades 128 are staggered with respect to the opposing arm 126 so as to provide essentially uniform coverage of the inner wall 92 adjacent to steam jacket volume 100.

During operation, rice grains and heated water may be introduced through access hatch 106. Preferably, the rice grains are unground rice comprising whole grains and broken grains such as naturally occur during grain shipping and handling. Other ingredients according to the table provided above may also be added at this time.

Steam introduced into the steam jacket volume 100 maintains the mixture at between 185 and 190° F. while it is blended with the high shear mixer head 116 and prevented from caking to the inner wall 92 by scraper blades 128.

Figure 6:
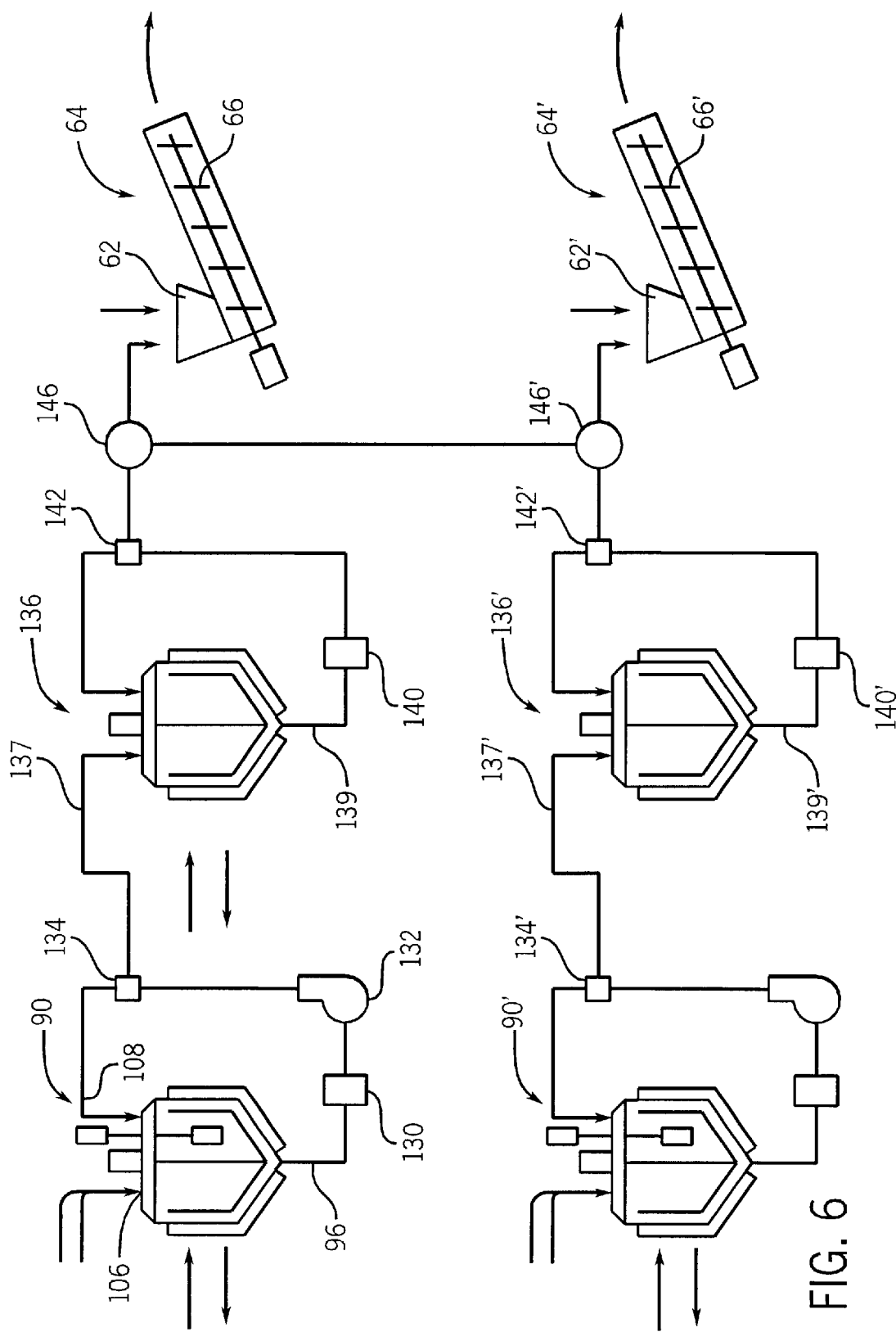
FIG. 6 shows an arrangement of a manufacturing line employing two kneading vessels of FIG. 2, two of the manufacturing vessels of FIG. 5 and two modified vessels similar to that of FIG. 5 providing holding tanks, together allowing for continuous manufacture of the pasta filata cheese of the present invention.

Referring now to FIG. 6 during blending, the mixture may be extracted from drain port 96 to be pumped by positive displacement pump 130 and then by shear pump 132 through valve 134 back into entrance port 108 providing additional shearing of the mixture and its constant recirculation. Still referring to FIG. 6, two such vessels 90 and 90' may be arranged to operate in tandem so that one vessel may be cleaned or refitted while the other vessel is creating the rice water blend. By means of valve 134, (or valve 134' on tank 90'), the contents of the vessels 90 and 90', respectively, may be pumped to a pasteurizing tank 136 (or 136') being identical to vessels 90 and 90' except for the absence of the shear mixer motor 110, shaft 112, and high shear mixer head 116. Tanks 136 and 136' include inlet ports 137, 137' connected each to an outlet of valves 134 or 134'.

The pasteurizing tanks 136, 136' may each have a positive feed pump 140 (or 140') receiving mixture from the tank 136 or 136' through drain ports 139 or 139', respectively, corresponding generally to drain port 96 as pumped by the pumps 140 or 140' to valves 142 or 142' for recirculation back into the tanks 136, 136'. Valves 142 and 142' provide the rice water mixture to two way valves 146 and 146' which may direct the mixture either of hopper 62 or 62' of two corresponding kneading chambers 64 or 64' or to a second inlet on the other valve 146, 146'.

Thus, vessels 90 and 90' may be operated on a batch or intermittent basis with their product shunted to respective pasteurizing tanks 136 or 136' for pasteurizing and holding. Tanks 136 and 136' may hold the cheese rice substitute until it is needed and then via valves 142 and 142' set to provide either of the kneading chambers 164 or 164' with the mixture. As have been previously described, each kneading chamber 164 or 164' includes an auger 66 or 66' for kneading the rice water mixture into pasta filata cheese.

It will be understood, therefore, that the kneading chambers 64 and 64' may be operated on an essentially continuous basis with the rice cheese substitute being manufactured in batches in vessels in 90 and 90'. Further the operation of the equipment need not be halted for cleaning operations of the vessels 90, 90', 136 or 136' as dual flow paths exist to either of the kneading chambers 64 or 64'.

Figure 7:
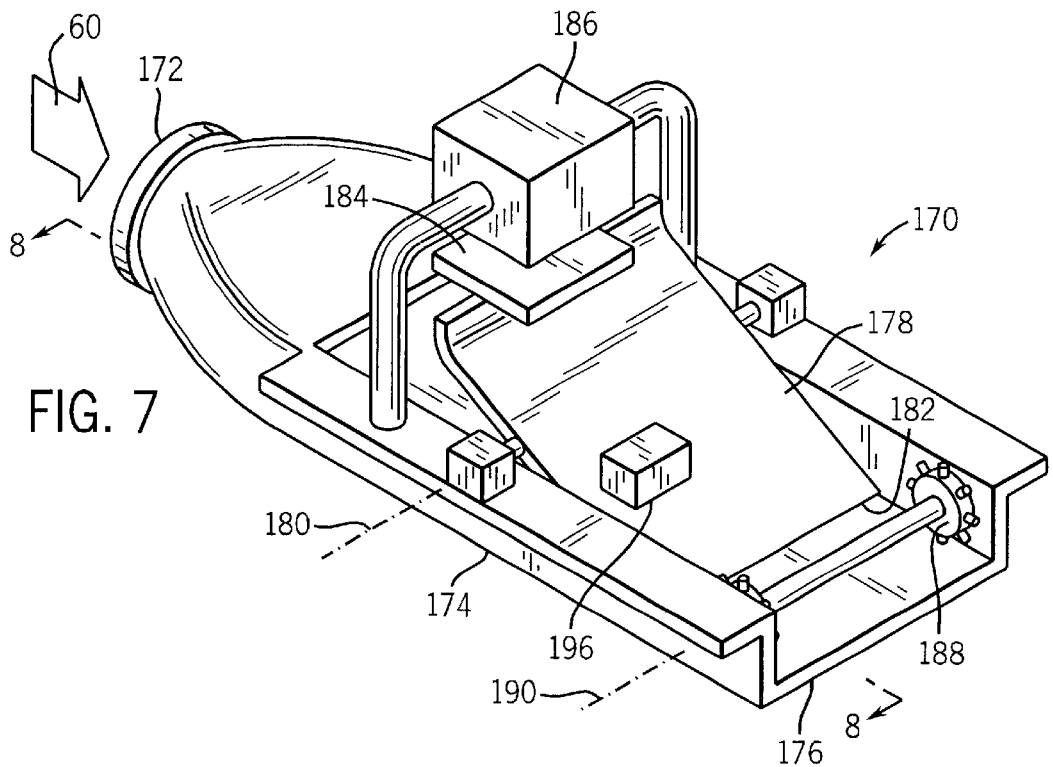
FIG. 7 is a perspective view of a cheese volume flow meter such as may be used with the present invention for determining the flow rate of cheese or other material so as to provide a basis for automatic control of the ratio of the rice/cheese blend and cheese in the auger system of FIGS. 1 and 6.
Figure 8:
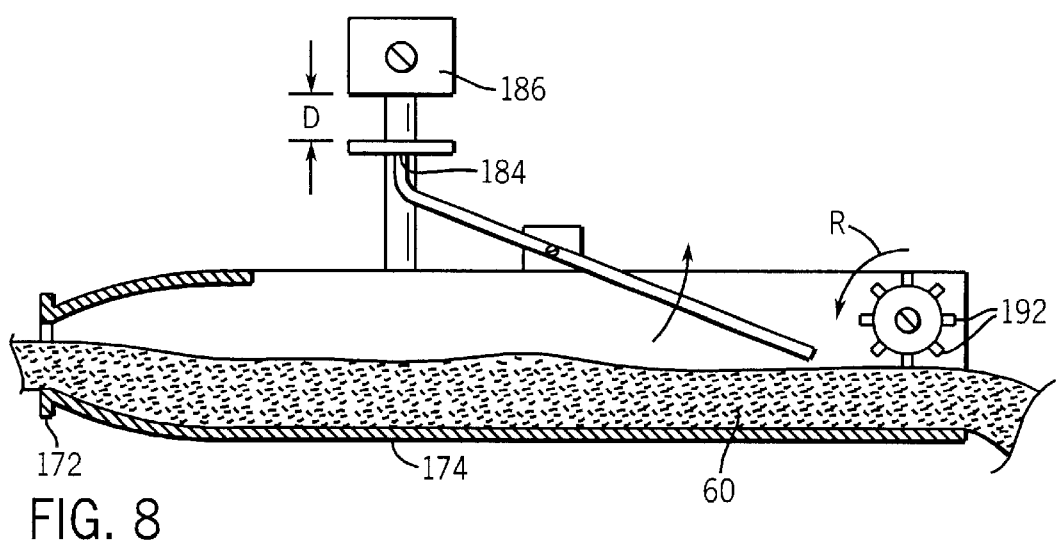
FIG. 8 is a simplified cross-sectional view along lines 8—8 of FIG. 7 showing the pin wheel for measuring linear flow of the cheese and thickness gauge for gauging its cross-sectional area to determine total volume.

Referring now to FIGS. 7 and 8, a cheese flow meter 170 useful for metering the rice mixture 16 into the cheese 60 or other food base includes an entrance aperture 172 through which cheese 60 may be introduced prior to the introduction of the rice mixture 16.

The cheese 60 travels along guiding trough 174 which terminates at an end lip 176 which may communicate with the hopper 62 shown in FIGS. 1, 2 and 6 of the kneading chamber 64. The trough 174 provides a generally rectangular cross-section defined between a bottom horizontal wall and upstanding sidewalls. An open upper face of the trough 174 is partially covered by a pivoting gauge plate 178 hinging about an axis 180 generally perpendicular to the longitudinal extent of the trough 174 and the travel of the cheese 60.

As pivoted, the gauge plate 178 may have one end follower 182 resting lightly upon the surface of the cheese 60 as it moves through the trough 174, the gauge plate 178 angularly pivoting with movement of the follower end 182 up and down as the height of the mass of cheese 60 changes.

A sensor end of the gauge plate 178 opposite the follower end 182 with respect to the axis 160 may include a proximity sensing target 184 adjacent to a proximity sensor 186 positioned thereabove. The operation of the proximity sensor target 184 and proximity sensor 186 is to provide a measure of the height of follower end 182 above the bottom of the trough 174 and thus an electronic measurement of the height of the cross-section of cheese 60 flowing through the trough 174.

Thus, it will be understood that insofar as the cheese 60 as it flows and spreads generally the full width of the bottom wall of the trough 174, the height of the follower end 182 above the bottom of the trough 174, together with knowledge of the width of the trough 174, provides a measurement of the cross-sectional area of the cheese 60 passing over the lip 176.

The follower end 182 of the gauge plate 178 may support rotatable pinwheels 188 being disks generally mounted for rotation along axis 190 parallel to axis 180. The periphery of the disks including radially extending pins 192 that may engage the surface of the cheese 60 as it passes above the lip 176 but beneath the follower end 182. The pin wheels 188 are free to rotate as the cheese 60 moves thus measuring in their rotation, a linear distance or velocity of cheese 60 passing over the lip 176.

The rotation of the pin wheels 188 may be detected by an electronic rotation sensor 196 of conventional design and provided to a microprocessor or microcontroller (not shown) together with the signal from the proximity sensor 186 to provide a volume rate or total volume of cheese flowing past lip 176.

This volumetric rate may be used to control a metering valve 50 prior to nozzle 58 to, in turn, control the ratio or rice mixture 16 to cheese 60 on an automatic basis. It will be understood that the cheese flow meter 170 may be used for a variety of materials other than pasta filata cheese where such metering is required.

Cream Cheese

Figure 9:
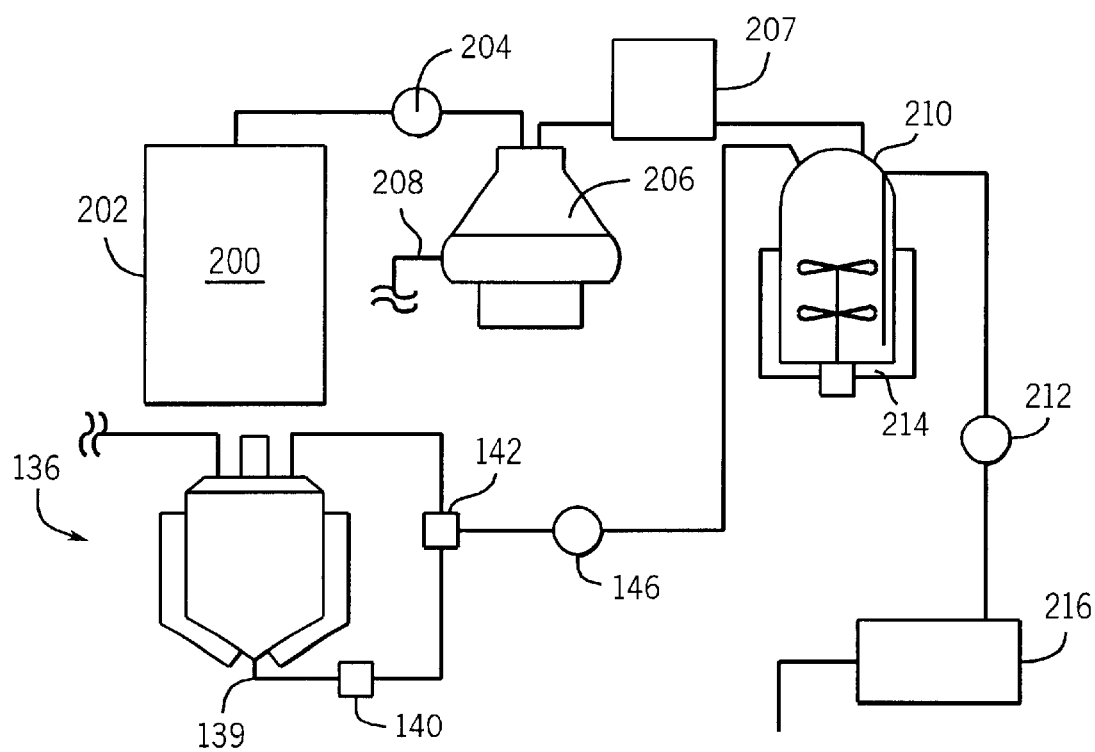
FIG. 9 is a figure similar to that of FIG. 6 showing use of the rice blend in the manufacture of cream cheese.

Referring now to FIG. 9, the rice blend of the present invention may find application in the manufacture of low fat cream cheese which begins with the culturing of a starter mix being, for example, in the case of low fat cottage cheese, skim milk 200 contained in a culturing silo 202. The starter mix may be incubated at 89° to 92° Fahrenheit with a bacterial starter culture suitable for cream cheese manufacture and preferably calf rennet according to techniques well known in the art. The culturing may continue for 6–8 hours until a PH of 4.6 is reached.

At this time the curd is broken up, cooked to 130F. to 170 Fahrenheit, and pumped by pump 204 into cream cheese separator 206 being a centrifugal type separation apparatus such as are available from a variety of different manufacturers and well known in the art. The separator 206 is operated so as to remove whey through whey outlet 208 and to provide a curd material having 40% to 60% moisture content by weight.

The moisture-reduced curd is then homogenized between 2500 and 3000 psi by homoginizer 207. The homogenized cream cheese is received by a blender 210, for example, a double agitator type blender. The blender 210 also receives the rice/water mixture at 140 to 160 degrees Fahrenheit as described above through valve 146 and the curd and rice/water mixture are blended at 120 to 170 degrees Fahrenheit. The rice/water mixture may be added to the moisture-reduced curd in an amount of 0% to 30%. During the blending process, salt may be added to the product.

Optional homogenization may occur at this time.

From the mixer the completed low fat cream cheese may be run through a heat exchanger 216 to cool it down or may be hot packed using hot pack equipment well known in the art.

Processed Meats—Sausages

Originally, sausage was produced in order to preserve excess meat. Today sausage is produced to meet the unique texture and flavor supplied by these products. Being meat products these foods typically have high fat and cholesterol. The industry is always searching for ways to maintain flavor and textural characteristics of these products while reducing fat and cholesterol.

Sausages are prepared in a variety of methods but typical procedures indicate chilled meat is blended with a solution of seasonings, water, and cure which is a preservative such as nitrates. The combined ingredients may include gums or alginates to help firm the product. Once the final mixture is made, the products are placed in a casing and cured by smoke and heat until an internal temperature of 155 F. is reached.

The use of rice mixture allows the sausage producers to dilute the fat and cholesterol, while maintaining flavor and texture characteristics. Another advantage of the rice mixture is that the use of gums or alginates are reduced or eliminated. Using a rice mixture also produces a more friendly ingredient statement.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. A method of manufacturing an augmented moisture food product comprising the steps of:

(a) forming a mixture by combining rice grains and heated water in a ratio allowing substantially complete absorption of the water within the rice grains;

(b) subjecting the mixture to high shear to liquefy the mixture without substantial release of water from the rice;

(c) combining the mixture with a cheese product; and (d) maintaining the mixture in a liquid state from step (b) to step (c).

2. The method of claim 1 wherein the cheese product is a cheese curd forming the basis of cream cheese.

3. The method of claim 2 including further the step of homogenizing the cheese curd at 2500 to 3000 psi.

4. The method of claim 1 wherein step (b) includes the steps of circulating the rice and water in a vessel with a high shear mixer and second pumping the rice and water through a shear pump.

5. The method of claim 4 wherein step (b) includes the step of scraping an inner surface of walls of the vessel while heating the walls of the vessel.

6. The method of claim 1 wherein the cheese product is selected from the group consisting of pasta filata cheese, feta cheese, process cheese, cheese spread, and cream cheese.

7. The method of claim 1 wherein the rice grains and water stand in a ratio of substantially 1:2 by weight.

8. The method of claim 1 including the step of adding corn syrup solids at step (b) where the weight of the corn syrup solids is less than one tenth the weight of the combined rice and water.

9. The method of claim 1 wherein at step (b) the heated water is at a temperature substantially equal to boiling water.

10. A method for producing low fat cream cheese, comprising the following steps:

(a) preparing a homogenized cream cheese curd;

(b) forming a mixture by combining rice grains and heated water in a ratio allowing substantially complete absorption of the water within the rice grains;

(c) subjecting the mixture In a high shear to produce a liquid mixture without the substantial release of water from the rice; and (d) circulating the liquid mixture through a shear pump to maintain the liquid mixture in a liquid form; and (e) blending the liquid mixture with the homogenized cream cheese curd.

11. The method of claim 10, wherein step (a) comprises:

(i) Placing a starter mix and a bacterial starter culture in a culturing silo and culturing to produce a curd;

(ii) Breaking up the curd;

(iii) Cooking the curd to a temperature between 130 and 170 degrees Fahrenheit;

(iv) Pumping the cooked curd to a cheese separator and activating the separator to remove whey from the curd; and (v) Providing the curd to a homogenizer and homogenizing the curd at between 2500 and 3000 psi.

12. The method of claim 11, wherein the starter mix of step (i) is a skim milk.

13. The method of claim 10, wherein step (b) further comprises the steps of:

(i) boiling water;

(ii) adding rice to the water;

(iii) cooking the rice for twenty-five minutes.

14. The method of claim 10, wherein step (c) comprises shearing the mixture for ten minutes.

15. The method of claim 10, wherein step (e) comprises blending the mixture with the cheese curd in an amount of between 0% and 30%.

16. A method for manufacturing cream cheese, comprising:

(a) providing a skim milk starter mix and a bacterial starter culture in a culturing silo;

(b) incubating the starter mix and starter culture until a predetermined pH at which curd is produced is reached;

(e) breaking up the curd and cooking the curd;

(d) pumping the curd into a centrifugal separator;

(e) operating the separator to remove whey from the curd;

(f) providing the moisture reduced curd to a homogenizer, and homogenizing the curd;

(g) providing the homogenized curd to a blender;

(h) pumping a liquid rice/water mixture into the blender through a valve; and (i) blending the liquid rice/water mixture with the curd to form cream cheese.

17. The method as defined in claim 16, wherein step (c) comprises cooking the curd to a temperature between 130 and 170 degrees Fahrenheit.

18. The method as recited in claim 16, wherein step (e) comprises removing whey from the curd to provide a moisture reduced curd having 40 to 60% moisture content by weight.

19. The method as recited in claim 16, wherein step (h) comprises pumping the liquid rice/water mixture in an amount of between 0% and 30%.

* * * * *